K. O. LEON.
BALL BEARING.
APPLICATION FILED NOV. 25, 1918.

1,305,131.

Patented May 27, 1919.

Inventor:
Karl Oscar Leon
By
George Bayard Jones
Attorney

UNITED STATES PATENT OFFICE.

KARL OSKAR LEON, OF STOCKHOLM, SWEDEN.

BALL-BEARING.

1,305,131.  Specification of Letters Patent.  Patented May 27, 1919.

Application filed November 25, 1918. Serial No. 264,067.

*To all whom it may concern:*

Be it known that I, KARL OSKAR LEON, a subject of the King of Sweden, residing at Stockholm, in the Kingdom of Sweden, have invented a new and useful Improvement in Ball-Bearings, of which the following is a specification.

The present invention relates to ball bearings of the type which are provided with resilient races supported on either side of the tracks or surfaces contacting with the balls. The invention is characterized by this that supports are provided opposite the balls on the opposite side of the races to that of the balls at such distances from the races that at excessive load on and bending of the races they will bear against said supports, before the elastic limit of the races is reached.

Figure 1:
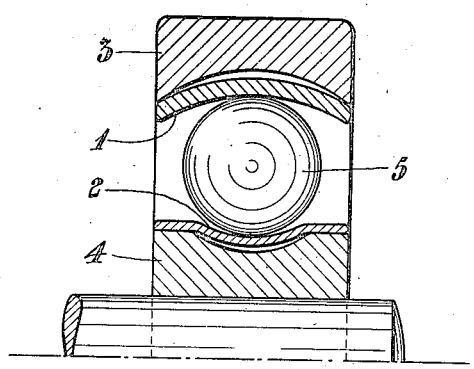

In the accompanying drawing two embodiments of ball bearings according to the present invention are shown by way of example. Figure 1 shows an axial section of one half of a ball bearing according to the first embodiment, and Fig. 2 shows a similar section of the second embodiment.

Referring to Fig. 1, the outer race 1 as well as the inner race 2 consist of suitably shaped rings or the like of for instance steel, which rings bear with their edges against the usual rings 3 and 4. The balls 5 are placed between the rings 1 and 2 in ordinary manner. It will be understood that mounted in this manner the rings 1 and 2 will be resilient. The distance at the center line of the bearing between each of the rings 1 and 2 and the corresponding supporting ring 3 or 4 is such that at excessive load the rings 1 and 2 when yielding will bear against the rings 3 and 4 before the elastic limits of the rings 1 and 2 is reached.

Figure 2:
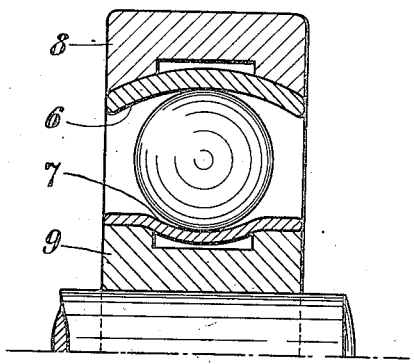

The embodiment illustrated in Fig. 2 is distinguished from the embodiment above described only in the manner in which the resilient rings 6 and 7 bear against the bearing rings 8 and 9. This construction is particularly applicable when it is desired to make one of the rings, for instance the ring 6, so thick that it is capable of receiving a somewhat higher load than that for which the bearing is designed without risk of the elastic limit being exceeded.

It will be understood that the embodiments above described may be changed and modified in various respects within the principle of the invention as expressed in the claim.

I claim:

In a ball bearing, the combination of balls, resilient races for said balls, supports for said races on either side of the tracks or surfaces of the races contacting with the balls, and supports opposite the balls on the opposite side of the races to that of the balls and located at such distances from the races that at excessive load on and bending of the races they will bear against the supports before the elastic limit of the races is reached.

KARL OSKAR LEON.